(12) United States Patent
Berthou et al.

(10) Patent No.: US 6,847,173 B2
(45) Date of Patent: Jan. 25, 2005

(54) BACKLIGHTING DEVICE FOR DISPLAY SCREEN BY NIGHT-VISION COMPATIBLE TRANSMISSION

(75) Inventors: Nicolas Berthou, Aze (FR); Jean-Marc Breda, Paris (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/466,920

(22) PCT Filed: Jan. 15, 2002

(86) PCT No.: PCT/FR02/00142
§ 371 (c)(1),
(2), (4) Date: Jul. 23, 2003

(87) PCT Pub. No.: WO02/060224
PCT Pub. Date: Aug. 1, 2002

(65) Prior Publication Data
US 2004/0057226 A1 Mar. 25, 2004

(30) Foreign Application Priority Data
Jan. 26, 2001 (FR) .......................................... 01 01104

(51) Int. Cl.⁷ ................................. F21V 7/04; F21V 9/16
(52) U.S. Cl. ........................ 315/169.3; 362/31; 362/86; 362/231
(58) Field of Search ........................ 315/169.3; 362/31, 362/86, 231, 555, 561, 583, 234, 85

(56) References Cited

U.S. PATENT DOCUMENTS

| | | | |
|---|---|---|---|
| 5,143,433 A | | 9/1992 | Farrell |
| 5,211,463 A | * | 5/1993 | Kalmanash ................... 362/26 |
| 5,229,844 A | | 7/1993 | Breda |
| 5,537,300 A | * | 7/1996 | Kraines et al. ................ 362/86 |
| 5,727,866 A | * | 3/1998 | Kraines et al. ................ 362/86 |
| 6,040,899 A | | 3/2000 | Breda |
| 6,091,335 A | | 7/2000 | Breda et al. |
| 6,132,072 A | | 10/2000 | Turnbull et al. |
| 6,419,372 B1 | * | 7/2002 | Shaw et al. .................. 362/231 |
| 6,521,884 B1 | | 2/2003 | Breda |

FOREIGN PATENT DOCUMENTS

| | | |
|---|---|---|
| EP | 0 364 346 A | 4/1990 |
| EP | 0 797 180 A | 9/1997 |

OTHER PUBLICATIONS

Patent Abstract of Japan; vol. 2000, No. 13, Feb. 5, 2001 & JP 2000 294379 A; Oct. 20, 2000.
Patent Abstract of Japan; vol. 1996, No. 11, Nov. 29, 1996 & JP 08 194445 A; Jul. 30, 1996.

* cited by examiner

*Primary Examiner*—Don Wong
*Assistant Examiner*—Chuc Tran
(74) *Attorney, Agent, or Firm*—Lowe Hauptman Gilman & Berner LLP.

(57) ABSTRACT

The present invention relates to a backlighting device, having several brightness levels, for a transmission display screen (12). The device comprises light sources placed in a case (14) between a translucent front wall formed by a diffuser screen (20) and a rear wall (24). The light sources, selected according to the desired brightness level, are mosaics (24, 28) of light-emitting diodes (26, 30) that are placed immediately behind the diffuser screen with, for the highest brightness level, a first mosaic (24) of light-emitting diodes that provides daytime illumination and with, for the lowest brightness level, a second mosaic (28) of light sources that supplies night-time illumination.

16 Claims, 3 Drawing Sheets

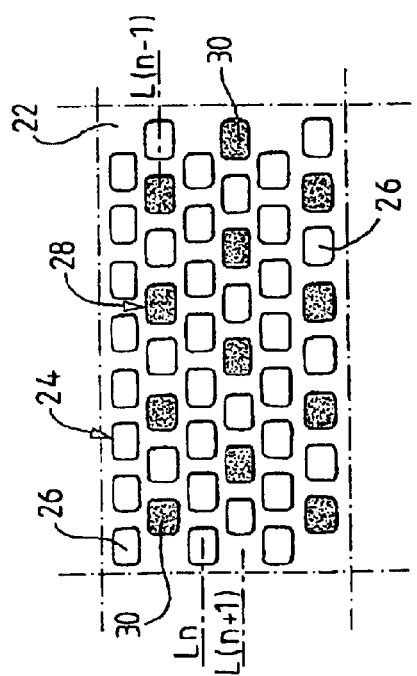
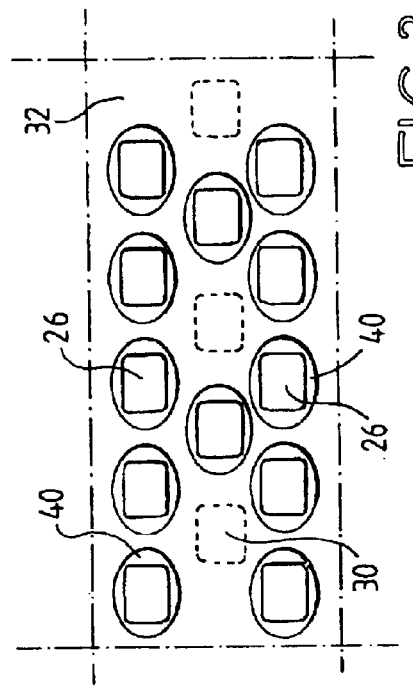
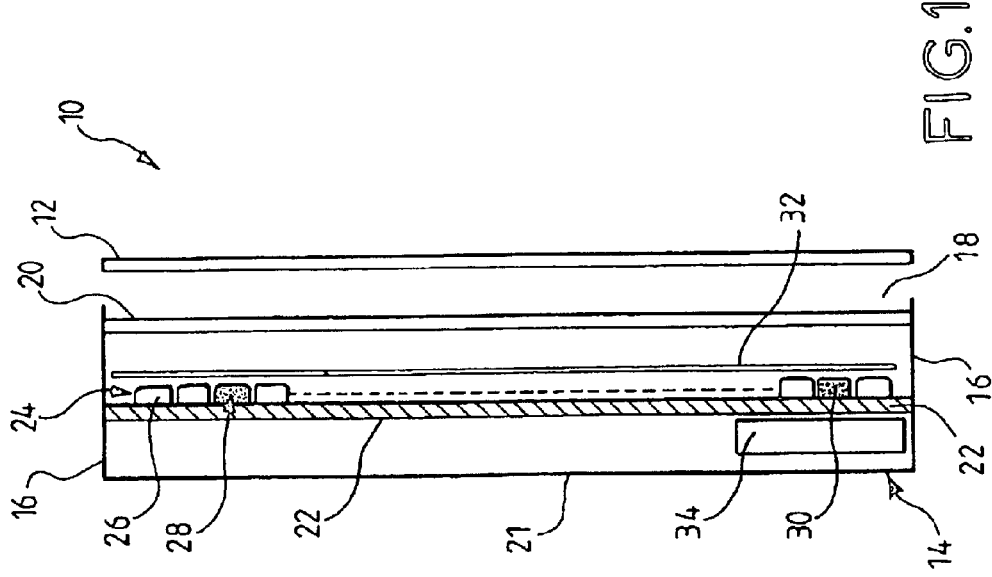

BACKLIGHTING DEVICE FOR DISPLAY SCREEN BY NIGHT-VISION COMPATIBLE TRANSMISSION

FIELD OF THE INVENTION

The present invention relates to transmissive-type display screens that require backlighting and especially with a light box providing this lighting.

BACKGROUND OF THE INVENTION

Color flat screens of the transmissive type, such as flat liquid crystal screens, used in avionics and in particular in the military field, comprise a multitude of pixels whose transparency is controlled by an electrical voltage. Each pixel is controlled separately with a view of forming an image on the screen. In the case of color images, each pixel is usually composed of a mosaic of three sub-pixels of different color and independently controlled. The final colors of the pixels that result therefrom, following an additive combination of light within the observer's eyes, are obtained by a particular combination of the control voltages for each sub-pixel.

In order to allow them to display, flat color screens of the transmissive type must be backlit by means of an auxiliary light source called a light box. For correct color rendering, this light source must illuminate the screen with white light as uniformly as possible.

Moreover, the screen must be able to be consulted under very varied ambient brightness conditions, for example during the day in full sunshine or when cloudy, and at night with low or zero illumination. These constraints require the use of a light source for backlighting with adjustable brightness over a wide range of light intensities, possibly with a ratio of up to 50, while maintaining a constant color temperature or emission spectrum in order to prevent deterioration of the colors of the backlit screen.

To obtain this large dynamic brightness range, light boxes for backlighting a transmissive flat color screen of the prior art comprise two stages of light sources placed behind a diffusing screen. The high brightness illumination for daytime mode is achieved using a first stage of light sources formed from a row of fluorescent tubes placed as a first curtain behind the diffusing screen. The low brightness illumination for one or more night-time modes is achieved by means of a second stage of light sources formed from a lower number of fluorescent lamps placed either as a second curtain, behind the first lamps, or along the sides of the light box.

Light boxes based on the use of fluorescent tubes have many drawbacks. The number of tubes used in the light box, because of their size, remains small, which has the drawback in the event of one of the tubes failing, despite the presence of the diffuser, of making the backlighting for the transmission display screen inhomogeneous. Furthermore, since the fluorescent tubes used for low lighting (night-time mode) are appreciably fewer than those used for high brightness lighting (daytime mode), they form an even more inhomogeneous light rail, with which it is more difficult to obtain uniform illumination of the screen. For this reason, the tubes for low lighting are furthest away from the diffusing screen and are always used in indirect lighting. The fluorescent tubes used for low lighting are placed as a second curtain, the tubes used for high brightness lighting, placed as a first curtain, serve as a mask preventing, by their presence in the path of the light rays from the tubes placed as the second curtain, direct illumination of the diffusing screen. When the second row of fluorescent tubes is placed along the sides of the light box, the tubes are coupled to a cavity in the light box via a particular optical waveguide. These arrangements of the fluorescent tubes result in light boxes of large size and high cost. Furthermore, the light boxes using fluorescent tubes or lamps pose problems of extracting the heat. This is because, as it is sought to produce a light box of smaller volume, the heat produced by the tubes builds up in a small volume; this heat is usually removed by thermal conduction through the rear face of the light box, which is contradictory to the position, near the diffuser screen, of the tubes of the first curtain that give the strongest illumination and therefore produce most of the heat in the box.

Furthermore, the use of fluorescent tubes, with a broad spectrum extending into the infrared, for providing low brightness illumination in night-time mode, poses problems of dazzling night vision amplifiers, especially infrared night vision goggles. An infrared filter for the tubes in night-time mode is then necessary, which increases the complexity of the light box, reduces the light intensity of the tubes and exacerbates the problem of heat dissipation due to the heat output by the tubes.

The subject of the present invention is a backlighting device, having several brightness levels, that provides improved solutions to the abovementioned problems and has a structure which is both simple and very compact. Therefore the invention proposes a backlighting device, having several brightness levels, for a transmission display screen, comprising light sources placed in a case between a translucent front wall formed by a diffuser screen and a rear wall, the light sources being selected according to the desired brightness level, characterized in that the light sources are mosaics of light-emitting diodes that are placed immediately behind the diffuser screen with, for the highest brightness level, a first mosaic of light-emitting diodes that provides daytime illumination and with, for the lowest brightness level, a second mosaic of light sources that supplies night-time illumination.

In a first embodiment of the backlighting device according to the invention, the first mosaic and the second mosaic of light-emitting diodes lie in the same plane, the light-emitting diodes being wired to the same printed circuit.

The use of light-emitting diodes provides great flexibility in adapting the intensity of illumination according to the ambient conditions. This is because, whether one is in the daytime mode or in the night-time mode by the respective use of the first or the second mosaic of light-emitting diodes, the light intensity may be easily adjusted by controlling the supply current to the light-emitting diodes. Thus, whether in daytime mode or in night-time mode, the light intensity may be matched perfectly to the particular ambient conditions. For example, in daytime mode, the light intensity of the first mosaic may be adjusted so as to emit light of maximum intensity when the backlit screen is consulted in full sunlight and reduced if the ambient light drops because of the presence of clouds or because it fails with the onset of dusk.

For this purpose, each mosaic is formed from a defined number of arrays of light-emitting diodes. The light intensity of the light-emitting diodes of an array is adjusted by controlling the current through the diodes by a semiconductor. The diodes of an array of light-emitting diodes in series with a semiconductor are preferably dispersed over the mosaics. This is because, should the transistor or one of the diodes of the array fail, the resulting change in brightness will be diffuse and not concentrated in one area of the light box, as is the case with fluorescent-tube light boxes of the prior art.

When the light box is used in night-time mode with equipment that is very sensitive to infrared radiation, a very low level of radiation emitted by the diodes may be sufficient to saturate such equipment. Advantageously, the light box includes an infrared filter between the diffuser and the mosaics of diodes that further reduces the low amount of infrared radiation able to be produced by the second mosaic of diodes.

SUMMARY OF THE INVENTION

In an alternative embodiment of the light box according to the invention, the infrared filter, between the diffuser and the diodes, and in immediate proximity to the mosaics of light-emitting diodes, comprises a mosaic of holes having the same distribution as the first mosaic of light-emitting diodes i.e., each of the light-emitting diodes of the first mosaic facing a respective hole of the infrared filter.

The invention will be more clearly understood with the aid of an illustrative example of a light box according to the invention with reference to the figures in which:

DESCRIPTION OF THE DRAWINGS

FIG. 1 shows an embodiment of a light box according to the invention;

FIG. 2 shows a partial view of the mosaics of the light-emitting diodes of the light box of FIG. 1;

FIG. 3 shows a partial view of the mosaics of the light-emitting diodes of FIG. 2 with an infrared filter;

DETAILED DESCRIPTION

Figure 4:
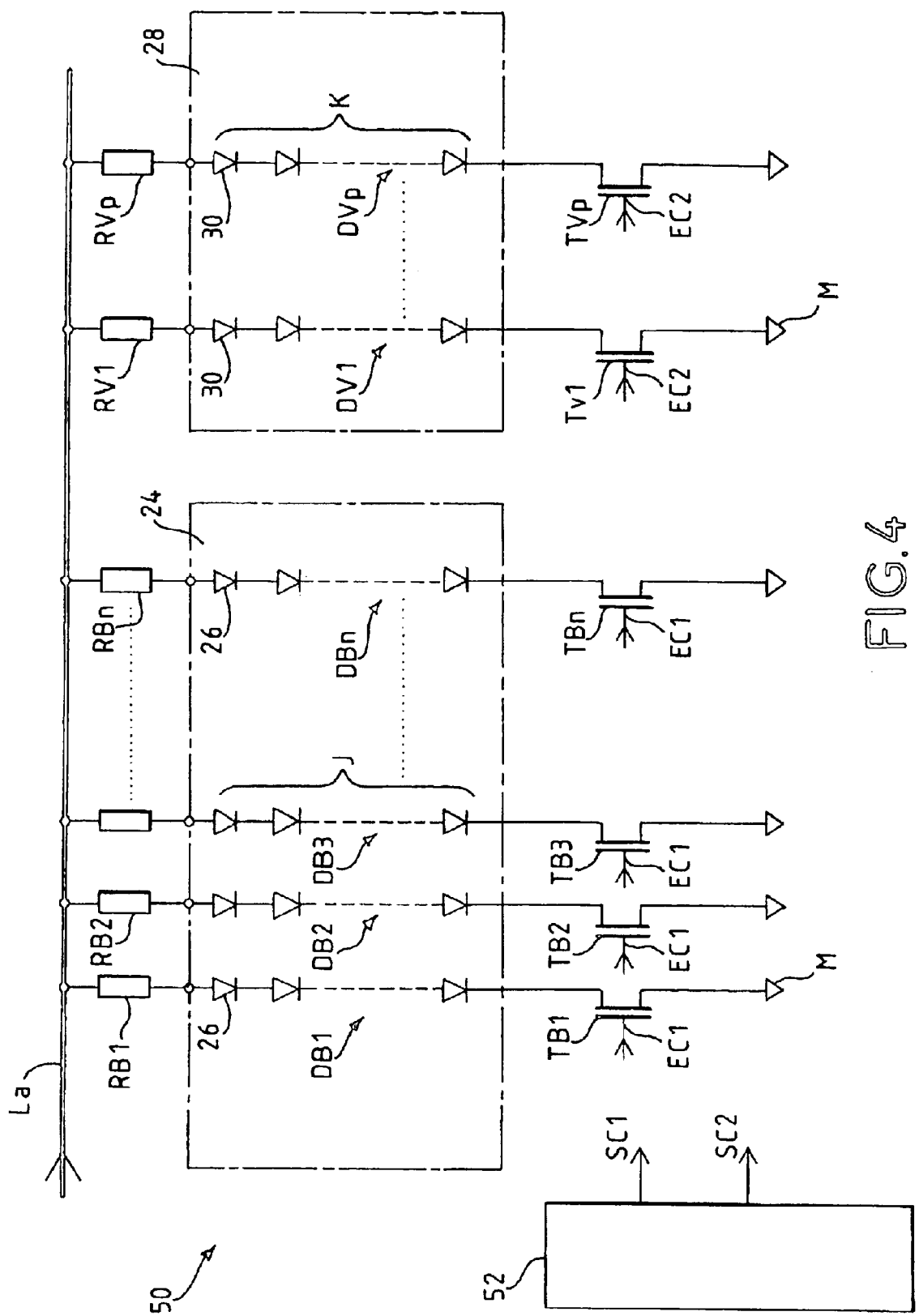
FIG. 4 shows a circuit diagram of a supply circuit for the light-emitting diodes of the light box of FIG. 1.

FIG. 1 shows a light box 10 according to the invention intended for backlighting a liquid-crystal display panel 12. The light box essentially comprises a parallelepipedal case 14 having side walls 16, an opening 18 with a light diffuser 20, and a rear wall 21.

The inside of the case 14 has a printed circuit 22 having two mosaics of light-emitting diodes, a first mosaic 24 produced with first diodes 26 emitting light of substantially white color and a second mosaic 28 produced with second diodes 30 emitting light of color that may be different (for example of green color).

The light box furthermore includes, between the diffuser and the mosaics of light-emitting diodes, an infrared filter 32 that eliminates infrared radiation that may be emitted by the light-emitting diodes toward the outside of the light box.

FIG. 2 shows a partial front view of the printed circuit 22 comprising the first mosaic 24 and the second mosaic 28 of light-emitting diodes. The diodes of both mosaics lie in the same plane by their wiring to the printed circuit 22 comprising electrical conductors for supplying the diodes with current. For this purpose, the printed circuit includes, on the side facing the rear face of the case 14, drive electronics 34 for turning on the diodes.

The distribution of diodes on the printed circuit is regular, of the honeycomb type, making it possible, on the one hand, to place a large number of diodes on the circuit surface and, on the other hand, to ensure the most homogeneous possible light emission towards the diffuser 20. The diodes of the two mosaics interpenetrate with a regular pitch, ensuring the best homogeneity of light emission whether in daytime mode or in night-time mode. For this purpose, in this embodiment, a line Ln of light-emitting diodes comprises only diodes of the first mosaic (white diodes), the next line L(n+1) or the previous line L(n−1) comprises a series of alternating diodes of the first and second mosaics (diodes of white and green color).

FIG. 3 shows a detailed view of the infrared filter 32 which comprises a mosaic of holes 40 having the same distribution as the first mosaic 24 of light-emitting diodes, each of the light-emitting diodes 26 of the first mosaic facing a respective hole 40 of the infrared filter. The mosaic of holes 40 produced in the infrared filter 32 prevents attenuation of the light radiation emitted by the white diodes that passes through the holes, it being unnecessary to filter the infrared in daytime mode. On the other hand, in the night situation, the infrared radiation is attenuated by the infrared filter which does not have holes facing the diodes of the second mosaic 28 that provides the night lighting.

The mosaic of holes 40 in the infrared filter may be produced by laser cutting, allowing great cutting precision.

The infrared filter may be made of a plastic, for example filters of the brand names "Korry" or "Schott" (especially with the reference BG 39) may be used.

FIG. 4 shows a circuit diagram of a supply circuit 50 for the first mosaic 24 and the second mosaic 28 of light-emitting diodes of the light box of FIG. 1 according to the invention. The diodes of the two mosaics are grouped together in an array of a small number of diodes, the array including an input and an output.

A supply line La supplies, via first current-limiting resistors RB1, RB2, . . . RBn, the respective inputs of n arrays DB1, DB2, . . . DBn of a number J of light-emitting diodes per array of the first mosaic 24 and, via second current-limiting resistors RV1, RV2, . . . RVp, the respective inputs of p arrays DV1, DV2, . . . DVp of a number K of light-emitting diodes per array. Each array of diodes is connected, via a respective semiconductor TB1, TB2, . . . TBn for the first mosaic 24 and TV1, TV2, . . . TVp for the second mosaic 28, to a reference potential M. Each semiconductor includes a control input allowing the current in the array of diodes to be varied, an input EC1 for the semiconductors of the first mosaic and an input EC2 for the semiconductors of the second mosaic. The semiconductor is a field-effect transistor.

In the embodiment shown in FIG. 4, the J diodes and K diodes of each of the arrays of diodes are connected in series, it being possible for the loss of a diode of an array DBx, where x=1,2, . . . n, or DVy, where y=1,2, . . . p, to cause at most the extinction of only the diodes of the array DBx or DVy.

J and K may be at least equal to 1 and, in this case, a single diode is controlled by a single semiconductor.

The supply circuit 50 includes an electronic drive circuit 52 having a first drive output SC1 feeding into the control inputs EC1 of the field-effect transistors of the first mosaic 24 and a second drive output SC2 feeding into the control inputs EC2 of the field-effect transistors of the second mosaic 28.

The drive signals EC1 and EC2, are in the form of periodic pulses of variable width. The variation in the width of the pulse causes a variation in the current through the semiconductor and, consequently, a variation in the level of illumination produced by the diodes.

The daytime or night-time modes will be controlled by the electronic drive circuit 52 by the saturation or turning-off of transistors associated with the arrays of one or other of the mosaics, and in each mode the lighting level may be adjusted by varying the pulse width of the signals output by the drives SC1 and SC2.

The description is not limited to field-effect transistors for driving the diodes or to electronic pulse drives, other electronic drive circuits for transistors such as bipolar transistors, may be used in a manner known to those skilled in electronics in order to vary the current and therefore the lighting provided by the light-emitting diodes of the two mosaics.

The diodes of each of the arrays are uniformly distributed and dispersed over the printed circuit. In the event of one of them failing, a small number of diodes (J or K) dispersed over the printed circuit is lost, which does not result in an appreciable change in the illumination in a given area of the box, unlike with the light boxes of the prior art having few light sources.

Figure 5:
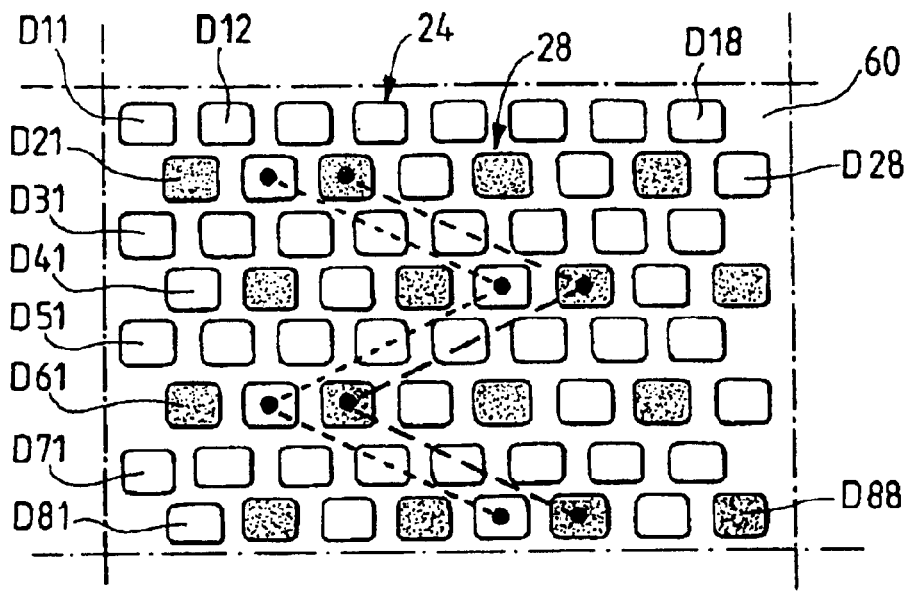
FIGS. 5 and 6 show two examples of diode arrays of the light box of FIG. 1.
Figure 6:
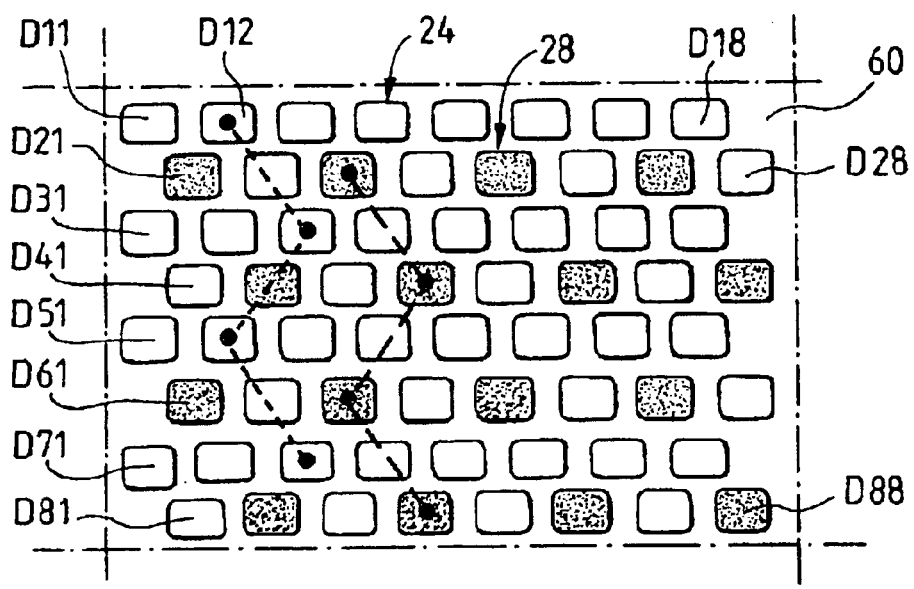

FIGS. 5 and 6 show two examples of the distribution of the light-emitting diodes of the arrays of the two mosaics.

Let us consider the printed circuit (22) to have a honeycomb distribution of light-emitting diodes and let us consider a part (60) of the printed circuit to comprise eight lines of eight light-emitting diodes each referenced DIc, I being the rank of the diode along a line and c the rank of the line, the distribution of the diodes being such that, when a line comprises only diodes of the first mosaic (24), the next or previous line comprises an alternation of a diode of the first mosaic (24) and a diode of the second mosaic (28) and so on, the first line being a line of the first mosaic, the second and sixth lines starting with a diode of the second mosaic. As a non-limiting example, it will be assumed that the arrays of light-emitting diodes described below each comprise four diodes, this number being limited only by the characteristics of the light-emitting diodes and the supply voltage applied. In a first distribution of the diodes of a diode array of the part 60 in question of the printed circuit 22 (see FIG. 5):

the array of the second mosaic 28 comprises four diodes, the diodes D23, D46, D63 and D86 being connected in series, the distribution being repeated by a horizontal translation along the lines forming arrays of the second mosaic that relate to this part 60 of the printed circuit 22; and the array of the first mosaic 24 comprises four diodes, the diodes D22, D45, D62 and D85 being connected in series, the distribution being repeated by a horizontal translation along the lines forming arrays of the first mosaic 24 that relate to this part 60 of the printed circuit 22.

In a second distribution of the diodes of a diode array of the part 60 in question of the printed circuit 22 (see FIG. 6):

the array of the second mosaic 28 comprises four diodes, the diodes D23, D44, D63 and D84 being connected in series, this distribution being repeated by a horizontal translation along the lines forming arrays of the second mosaic that relate to this part 60 of the printed circuit 22; and the array of the first mosaic 24 comprises four diodes, the diodes D12, D33, D52 and D73 (or D22, D43, D62 and D83) being connected in series, this distribution being repeated by a horizontal translation along the lines forming arrays of the first mosaic 24 that relate to this part 60 of the printed circuit 22.

The combination of the array of the first mosaic and the array of the second mosaic will be obtained by considering the entire surface of the printed circuit.

The light box according to the invention with two lighting levels (or two operating modes) offers the advantage of having only a single stage of lighting sources, unlike the two rows of fluorescent tubes of the light boxes of the prior art. This simplifies the mechanics and reduces the mechanical size and consequently the manufacturing cost. Furthermore, the dynamic range of the light intensity of the light-emitting diodes is greater than that of the fluorescent tubes.

Another advantage of the light boxes according to the invention lies in the use of low-voltage sources, unlike the high-voltage sources needed to supply the fluorescent tubes of boxes of the prior art. Furthermore, the breakdown withstand capability and the lifetime are markedly improved over boxes with fluorescent tubes.

What is claimed is:

1. A backlighting device, having several brightness levels, for a transmission display screen comprising:
    light sources placed in a case between a translucent front all formed by a diffuser screen and a rear wall, the light sources being selected according to the desired brightness level, the light sources being mosaics of light emitting diodes lying in the same plane that are placed immediately behind the diffuser screen with, for the highest brightness level, a first mosaic of light-emitting diodes that provides daytime illumination and with, for the lowest brightness level, second mosaic of light sources that supplies night-time illumination, characterized in that the distribution of diodes is such that the diodes of the two mosaics, interpenetrate with a regular pitch.

2. The backlighting device as claimed in claim 1, wherein the first mosaic and the second mosaic of light-emitting diodes are wired to the same printed circuit that includes electrical conductors for supplying current to the diodes.

3. The backlighting device as claimed in claim 1, wherein each mosaic is formed from a defined number of arrays (DB1, DB2, . . . DBn)(DV1, DV2, . . . DVp) of light-emitting diodes, the light intensity of the light-emitting diodes of an array being adjusted by controlling the current through the diodes by a semiconductor (TB1, TB2, . . . TBn)(TV1, TV2, . . . TVn).

4. The backlighting device as claimed in claim 3, wherein the diodes of an array of light-emitting diodes in series with a semiconductor are preferably dispersed over the mosaics.

5. The backlighting device as claimed in claim 1, wherein the light box includes an infrared filter between the diffuser and the mosaics of diodes that further reduce the low amount of infrared radiation able to be produced by the second mosaic of diodes.

6. The backlighting device as claimed in claim 5, wherein the infrared filter, between the diffuser and the diodes, and in immediate proximity to the mosaics of light-emitting diodes, comprises a mosaic of holes having the same distribution as the first mosaic of light-emitting diodes, each of the light-emitting diodes of the first mosaic facing a respective hole of the infrared filter.

7. The backlighting device as claimed in claim 2, wherein the distribution of diodes on the printed circuit is regular, of the honeycomb type, a line Ln of light-emitting diodes comprising only diodes of the first mosaic, the next line L(n+1) or the previous line L(n−1) comprising a series of alternating diodes of the first and second mosaics.

8. The backlighting device as claimed in claim 3, wherein the printed circuit includes drive electronics for turning on the diodes.

9. The backlighting device as claimed in claim 1, wherein it includes a supply circuit for the first mosaic and the second mosaic of light-emitting diodes, the diodes of the two mosaics being grouped together in an array of a small number of diodes, the array including an input and an output.

10. The backlighting device as claimed in claim 9, wherein the supply circuit includes a supply line La supplying, via first current-limiting resistors (RB1, RB2, . . . RBn), the respective inputs of n arrays (DB1, DB2, . . . DBn) of a number J of light-emitting diodes per array of the first mosaic and, via second current-limiting resistors (RV1, RV2, . . . RVp), the respective inputs of p arrays (DV1, DV2, . . . DVp) of a number K of light-emitting diodes per array, each array of diodes being connected, via a respective semiconductor (TB1, TB2, . . . TBn) for the first mosaic and (TV1, TV2, . . . TVp) for the second mosaic, to a reference potential (M), each semiconductor including a control input EC1 for the semiconductors of the first mosaic and a control input EC2 for the semiconductors of the second mosaic, allowing the current in the arrays of diodes to be varied.

11. The backlighting device as claimed in claim 10, wherein the semiconductor is a field-effect transistor.

12. The backlighting device as claimed in claim 10, wherein the J diodes and K diodes of each of the arrays of diodes are connected in series, it being possible for the loss of a diode of an array DBx, where x=1,2, . . n, or DVy, where y=1,2, . . . p, to cause at most the extinction of only the diodes of the array DBx or DVy.

13. The backlighting device as claimed in claim 2, wherein the printed circuit comprises a honeycomb distribution of light-emitting diodes and in that, considering a part of the printed circuit to comprise eight lines of eight light-emitting diodes each referenced DIc, I being the rank of the diode along a line and c the rank of the line, the distribution of the diodes is such that, when a line comprises only diodes of the first mosaic, the next or previous line comprises an alternation of a diode of the first mosaic and a diode of the second mosaic and so on, the first line being a line of the first mosaic, the second and sixth lines starting with a diode of the second mosaic.

14. The backlighting device as claimed in claim 13, wherein a first distribution of the diodes of a diode array of the part in question of the printed circuit:

the array of the second mosaic comprises four diodes, the diodes D23, D46, D63 and D86 being connected in series, the distribution being repeated by a horizontal translation along the lines forming arrays of the second mosaic that relate to this part of the printed circuit; and the array of the first mosaic comprises four diodes, the diodes D22, D45, D62 and D85 being connected in series, the distribution being repeated by a horizontal translation along the lines forming arrays of the firs mosaic that relate to this part of the printed circuit.

15. The backlighting device as claimed in claim 13, wherein a second distribution of the diodes of a diode array of the part in question of the printed circuit:

the array of the second mosaic comprises four diodes, the diodes D23, D44, D63 and D84 being connected in series, this distribution being repeated by a horizontal translation along the lines forming arrays of the second mosaic that relate to this part of the printed circuit; and the array of the first mosaic comprises four diodes, the diodes D12, D33, D52 and D73 (or D22, D43, D62 and D83) being connected in series, this distribution being repeated by a horizontal translation along the lines forming arrays of the first mosaic that relate to this part of the printed circuit.

16. The backlighting device as claimed in claim 13 wherein the combination of the array of the first mosaic and the array of the second mosaic is obtained by considering the entire surface of the printed circuit.

* * * * *